US011407860B2

(12) United States Patent
Jung et al.

(10) Patent No.: US 11,407,860 B2
(45) Date of Patent: Aug. 9, 2022

(54) METHOD FOR PREPARING POLYARYLENE SULFIDE

(71) Applicant: LG CHEM, LTD., Seoul (KR)

(72) Inventors: Kwonsu Jung, Daejeon (KR); Joong Jin Han, Chungju-si (KR); Eunju Park, Daejeon (KR); Hyun Woog Ryu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 604 days.

(21) Appl. No.: 16/462,771

(22) PCT Filed: Jan. 12, 2018

(86) PCT No.: PCT/KR2018/000632
§ 371 (c)(1),
(2) Date: May 21, 2019

(87) PCT Pub. No.: WO2018/212426
PCT Pub. Date: Nov. 22, 2018

(65) Prior Publication Data
US 2019/0367681 A1 Dec. 5, 2019

(30) Foreign Application Priority Data
May 15, 2017 (KR) .......................... 10-2017-0060149

(51) Int. Cl.
C08G 75/0222 (2016.01)
C08G 75/0254 (2016.01)
C08G 75/0281 (2016.01)

(52) U.S. Cl.
CPC ..... C08G 75/0222 (2013.01); C08G 75/0254 (2013.01); C08G 75/0281 (2013.01)

(58) Field of Classification Search
CPC .......................... C08G 75/14; C08G 75/0263; C08G 75/0268; C08G 75/0259; C08G 75/025; C08G 75/0281
See application file for complete search history.

(56) References Cited

U.S. PATENT DOCUMENTS

| | | | |
|---|---|---|---|
| 4,645,826 A | 2/1987 | Iizuka et al. | |
| 4,810,773 A | 3/1989 | Ogata et al. | |
| 4,935,473 A | 6/1990 | Fukuda et al. | |
| 4,988,796 A | 1/1991 | Cliffton et al. | |
| 5,126,430 A * | 6/1992 | Senga | C08G 75/025 528/226 |
| 5,278,283 A | 1/1994 | Miyoshi et al. | |
| 5,929,203 A | 7/1999 | Ash et al. | |

(Continued)

FOREIGN PATENT DOCUMENTS

| | | |
|---|---|---|
| EP | 0301566 A2 | 2/1989 |
| EP | 3473660 A2 | 4/2019 |

(Continued)

OTHER PUBLICATIONS

Fahey et al, "Mechanism of Poly (p-phenylene sulfide) Growth from p-Dichlorobenzene and Sodium Sulfide", Macromolecules, 1991, vol. 24, No. 15, pp. 4242-4249.

*Primary Examiner* — Shane Fang
(74) *Attorney, Agent, or Firm* — Dentons US LLP

(57) ABSTRACT

A method for preparing polyarylene sulfide that can control a viscosity grade thereof by adjusting the molar ratio of water and amide-based compounds present in a polymerization reaction.

10 Claims, 1 Drawing Sheet

(56) References Cited

U.S. PATENT DOCUMENTS

| | | | |
|---|---|---|---|
| 2006/0074219 | A1 | 4/2006 | Kawama et al. |
| 2009/0156780 | A1 | 6/2009 | Kawama et al. |
| 2011/0124825 | A1 | 5/2011 | Konno et al. |
| 2013/0065054 | A1 | 3/2013 | Ichinose et al. |
| 2016/0244612 | A1* | 8/2016 | Unohara ................ C08L 23/02 |
| 2016/0280859 | A1 | 9/2016 | Chiong |
| 2017/0137573 | A1 | 5/2017 | Suzuki et al. |

FOREIGN PATENT DOCUMENTS

| | | | |
|---|---|---|---|
| JP | 60-44526 | A | 3/1985 |
| JP | 61-066720 | A | 4/1986 |
| JP | 60-043422 | A | 2/1987 |
| JP | 08-013887 | B2 | 2/1996 |
| JP | 2001-261832 | A | 9/2001 |
| JP | 2003-246858 | A | 9/2003 |
| JP | 2004-244619 | A | 9/2004 |
| JP | 4055058 | B2 | 3/2008 |
| JP | 2009-57414 | A | 3/2009 |
| JP | 2010-106179 | A | 5/2010 |
| KR | 10-1991-0007007 | B1 | 9/1991 |
| KR | 10-2013-0025349 | A | 3/2013 |
| KR | 10-2016-0127831 | A | 11/2016 |
| WO | 2010/010760 | A1 | 1/2010 |
| WO | 2011-145428 | A1 | 11/2011 |
| WO | 2015/152032 | A1 | 10/2015 |

* cited by examiner

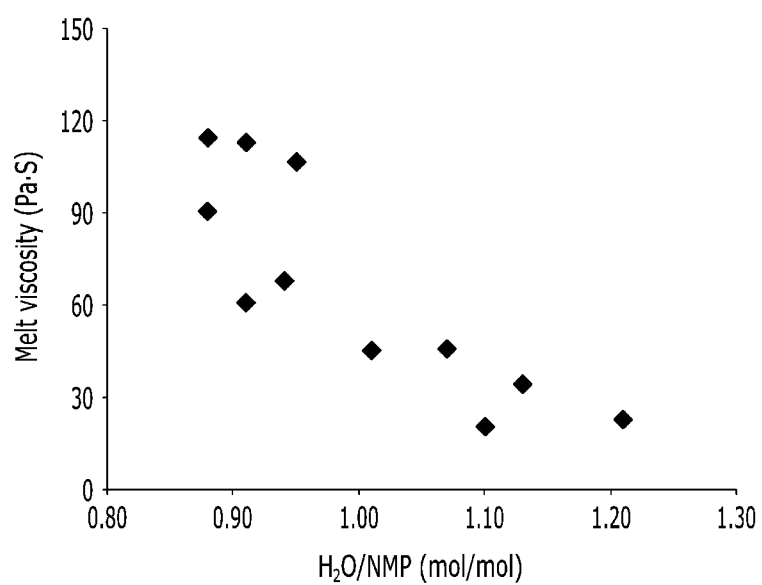

METHOD FOR PREPARING POLYARYLENE SULFIDE

CROSS-REFERENCE TO RELATED APPLICATION(S)

This application is the U.S. national stage of international Application No. PCT/KR2018/000632 filed on Jan. 12, 2018, which claims priority to and the benefit of Korean Patent Application No. 10-2017-0060149 filed on May 15, 2017 with the Korean Intellectual Property Office, the disclosures of which are incorporated herein by reference in its entirety.

TECHNICAL FIELD

The present invention relates to a method for preparing polyarylene sulfide that easily controls a viscosity grade.

BACKGROUND ART

Polyarylene sulfide (PAS) which is represented by polyphenylene sulfide (PPS) has excellent strength, heat resistance, flame retardancy, and processability, and thus is widely used as a substitute for metals in automobiles, electrical and electronic products, and machinery, and particularly for die casting metals such as aluminum and zinc. In particular, since PPS resin has good fluidity, it is advantageous for use as a compound by kneading it with a filler such as glass fiber or a reinforcing agent.

Generally, PAS is produced by a polymerization reaction of a sulfur source and a dihalogenated aromatic compound under polymerization conditions in the presence of a polar organic compound, such as N-methylpyrrolidone (NMP), and if necessary, a molecular weight modifier such as an alkali metal salt may be more used. The reaction product obtained as a result of the polymerization reaction includes an aqueous phase and an organic phase, and the produced PAS is mainly dissolved and contained in the organic phase. Accordingly, a process for separating the produced PAS is additionally carried out, and a method for precipitating PAS by cooling the reaction product is mainly used.

Specifically, the cooling method may include one in which a polar organic compound is rapidly evaporated by reducing pressure of the reaction product, or a method in which more polar organic compounds are added to the reaction product to cool the reaction product, and the bulk properties, shape, particle size, etc. of the PAS may vary depending on the cooling method.

In another cooling method at the end the polymerization reaction, water is added to the reaction product to cool or quench the polymerization reaction. Water quenching produces PAS having a larger particle size compared to quenching using polar organic compounds, which facilitates the separation of PAS from side-reaction solid components having relatively small particle sizes, such as residual salts or slime formed in the polymerization reaction. However, when too much water is used during water quenching, the particle size of PAS may become too large with respect to downstream separation/handling devices, resulting in device damage or shutdown, production of off-specification PAS, and contamination of the PAS. On the other hand, when too little water is used, the particle size of the PAS may become too small, which can lead to a loss of PAS, wherein the PAS is eliminated together with the stream of separated reaction by-products. Therefore, when the amount or type of cooling liquid is not accurate, it is not easy to control the particle size of PAS particles precipitated during cooling.

In addition, factors that may affect the properties of the produced PAS are not only the amount of cooling solution added, but also the total amount of water present in the reaction system.

However, when an upper stream dehydration process of a feedstock flowing into the reactor is not efficient, it is difficult to predict the water amount in the reaction system, and the reaction time is also increased. In such a case, the properties of the PAS in the reaction system cannot be predicted until immediately before quenching.

Accordingly, there is need to develop a method that is capable of measuring the amount of water present in the polymerization reaction system and thereby determining a more accurate amount of cooling solvent. Furthermore, there is need to develop a method which can easily control the physical properties of PAS obtained through the control of the amount of water present in the polymerization reaction system and the amount of the cooling solvent, and in particular, the viscosity grade of PAS for improving the applicability to various fields.

DETAILED DESCRIPTION OF THE INVENTION

Technical Problem

It is one object of the present invention to provide a method for preparing polyarylene sulfide that easily controls a viscosity grade.

Technical Solution

According to one embodiment of the present invention, a method for preparing polyarylene sulfide having a melt viscosity of 0.1 Pa·S to 150 Pa·S is provided, including: a first step of reacting a hydrosulfide of an alkali metal with a hydroxide of an alkali metal in a mixed solvent of water and an amide-based compound in the presence of an organic acid salt of an alkali metal, and then dehydrating the resulting reaction product to prepare a sulfur source including a sulfide of an alkali metal and a mixed solvent of water and an amide-based compound; and a second step of adding a dihalogenated aromatic compound and an amide-based compound to the sulfur source to carry out a polymerization reaction, wherein the amide-based compound in the second step is added in an amount such that the molar ratio of water to the amide-based compound present in the polymerization reaction system (molar ratio of water/amide-based compound) is 0.85 or more.

Advantageous Effects

The polyarylene sulfide produced by the method for preparing polyarylene sulfide according to the present invention can easily control its viscosity grade.

Further, the polyarylene sulfide produced by the preparation method described above has excellent fluidity together with controlled viscosity properties, and thus can exhibit improved compatibility with fillers and reinforcing agents. Consequently, it can be useful in the manufacture of molded articles for substituting for metals in automobiles, electric or electronic products, or mechanical components, especially in the manufacture of reflectors or base plates for an automobile lamp which requires excellent mechanical properties.

BRIEF DESCRIPTION OF DRAWING

The FIGURE is a graph showing a change in melt viscosity of polyphenylene sulfide depending on a molar ratio of $H_2O$/NMP in a polymerization reaction system of Experimental Example 2.

DETAILED DESCRIPTION OF THE EMBODIMENTS

Hereinafter, the present invention will be described in more detail. The invention can undergo various modifications and take various forms, and thus specific embodiments are illustrated and described in detail below. It should be understood, however, that the invention is not intended to be limited to any particular disclosure form, but includes all modifications, equivalents, and alternatives falling within the spirit and scope of the invention.

In addition, it will be further understood that the meaning of the terms "comprise" and "include" as used herein is intended to specify the presence of stated features, ranges, integers, steps, operations, elements, and/or components, but does not preclude the presence or addition of other features, ranges, integers, steps, operations, elements, and/or components.

Hereinafter, the method for preparing polyarylene sulfide according to a specific example of the present invention, a polyarylene sulfide prepared using the same, and a molded article including the same, will be described.

In the case of conventional polyarylene sulfides including polyphenylene sulfide, it is difficult to confirm the molecular weight during the preparation process, and thus the viscosity is measured after the reaction is completed and drying has occurred. Accordingly, it is not easy to control the viscosity grade.

In the meantime, the present inventors found that, in the preparation of polyarylene sulfide by a polymerization reaction of a sulfur source and a dihalogenated aromatic compound in a mixed solvent of water and an amide-based compound, the ratio of the water/amide-based compound present in the polymerization system has a correlation with the melting point of the finally prepared polyarylene sulfide, and confirmed, through gas chromatography (GC), the amount of water and amide-based compound in a dehydration liquid obtained in the process of dehydration during the production of the sulfur source, and then optimized the ratio of the water/amide-based compound present in the polymerization reaction system, thereby providing a method for easily preparing polyarylene sulfide having a desired viscosity grade.

Specifically, the method for preparing polyarylene sulfide according to one embodiment of the present invention includes: a first step of reacting a hydrosulfide of an alkali metal with a hydroxide of an alkali metal in a mixed solvent of water and an amide-based compound in the presence of an organic acid salt of an alkali metal, and then dehydrating the resulting reaction product to prepare a sulfur source including a sulfide of an alkali metal and a mixed solvent of water and an amide-based compound; and a second step of adding a dihalogenated aromatic compound and an amide-based compound to the sulfur source to carry out a polymerization reaction.

The amide-based compound in the second step is added such that the molar ratio of water to the amide-based compound present in the polymerization reaction system (molar ratio of water/amide-based compound) is 0.85 or more.

Hereinafter, each step will be described in detail. In the method for preparing polyarylene sulfide according to one embodiment of the present invention, the first step is a step of preparing a sulfur source.

The sulfur source is prepared by reacting a hydrosulfide of an alkali metal with a hydroxide of an alkali metal in a mixed solvent of water and an amide-based compound in the presence of an organic acid salt of an alkali metal and then then subjecting the resulting reaction product to dehydration, and it may include a mixed solvent of water and an amide-based compound which remains in the solvent without being dehydrated, together with an sulfide of an alkali metal produced by the reaction of the hydrosulfide of an alkali metal with the hydroxide of an alkali metal.

The sulfide of an alkali metal included in the sulfur source may be determined according to the type of the hydrosulfide of an alkali metal used in the preparation reaction. Specific examples thereof include lithium sulfide, sodium sulfide, potassium sulfide, rubidium sulfide, and cerium sulfide, and a mixture of any one or two or more may be included.

Further, during the preparation of the sulfur source by the reaction of the hydrosulfide of an alkali metal with the hydroxide of an alkali metal, specific examples of the alkali metal hydrosulfide that can be used may include lithium hydrogen sulfide, sodium hydrogen sulfide, potassium hydrogen sulfide, rubidium hydrogen sulfide, cesium hydrogen sulfide, etc. Among them, any one or a mixture of two or more thereof can be used, and an anhydride or hydrate thereof can also be used.

Furthermore, specific examples of the hydroxide of an alkali metal may include lithium hydroxide, sodium hydroxide, potassium hydroxide, rubidium hydroxide, cesium hydroxide, etc., and among them, any one or a mixture of two or more thereof may be used. The hydroxide of an alkali metal may be used in an equivalent ratio of 0.90 to 2.0, more specifically 1.0 to 1.5, and still more specifically 1.0 to 1.1, based on 1 equivalent of the hydrosulfide of an alkali metal. When used in the above equivalent ratio, a sulfide of an alkali metal can be produced with superior efficiency.

In the present invention, the equivalent ratio means a molar equivalent (eq/mol).

In addition, when preparing the sulfur source by the reaction of the hydrosulfide of an alkali metal with the hydroxide of an alkali metal, an organic acid salt of an alkali metal capable of enhancing the degree of polymerization within a short period of time by promoting the polymerization reaction may be added as a polymerization aid. Specific examples of the organic acid salt of an alkali metal may include lithium acetate, sodium acetate, etc., and any one or a mixture of two or more thereof may be used. The organic acid salt of the alkali metal may be used in an equivalent ratio of 0.01 to 1.0, more specifically 0.01 to 0.8, and still more specifically 0.05 to 0.5, based on 1 equivalent of the hydrosulfide of an alkali metal. When used in the above equivalent ratio, a sulfide of an alkali metal can be produced with superior efficiency.

Further, the reaction of the hydrosulfide of an alkali metal with the hydroxide of an alkali metal may be carried out in a mixed solvent of water and an amide-based compound. In this case, specific examples of the amide-based compound may include an amide compound such as N,N-dimethylformamide, N,N-dimethylacetamide, etc.; a pyrrolidone compound such as N-methyl-2-pyrrolidone (NMP), N-cyclohexyl-2-pyrrolidone, etc.; a caprolactam compound such as N-methyl-ε-caprolactam, etc.; an imidazolidinone compound such as 1,3-dialkyl-2-imidazolidinone, etc.; a urea compound such as tetramethylurea, etc.; or a phosphoric acid amide compound such as hexamethylphosphoric triamide, etc., and any one or a mixture of two or more thereof may be used. Among them, the amide compound may be more specifically N-methyl-2-pyrrolidone (NMP) in view of enhancing reaction efficiency and obtaining a cosolvent effect as a polymerization solvent during the polymerization for preparing polyarylene sulfide.

Furthermore, the water in the mixed solvent may be used in an equivalent ratio of 1 to 8, more specifically 1.5 to 5, and still more specifically 2.5 to 4.5, based on 1 equivalent of the amide-based compound. When used in the above equivalent ratio, the amount of the amide-based compound in the polymerization reaction system for preparing polyarylene sulfide can be easily controlled, and the time for a subsequent dehydration process can be appropriately controlled.

As a result of the reaction of the hydrosulfide of an alkali metal with the hydroxide of an alkali metal as described above, the alkali metal sulfide is precipitated as a solid phase in the mixed solvent of water and the amide-based compound. In addition, some unreacted hydrosulfide of an alkali metal may remain in the resulting reaction product. Accordingly, when the sulfur source prepared by reacting the hydrosulfide of an alkali metal with the hydroxide of an alkali metal is used as a sulfur source during the preparation of the polyarylene sulfide according to the present invention, the molar ratio of the sulfur source means the total molar ratio of the sulfide of an alkali metal precipitated as a result of the reaction to the unreacted hydrosulfide of an alkali metal.

Subsequently, a dehydration process is carried out to remove the solvent such as water or the like in the reaction product including the alkali metal sulfide produced as a result of the reaction above.

During the dehydration process, some of the amide-based compound is discharged together with water, and some sulfur contained in the sulfur source can react with water by heat during the dehydration process and be volatilized as hydrogen sulfide gas. At this time, a hydroxide of an alkali metal may be produced in the same molar equivalent as the hydrogen sulfide.

In the method for preparing polyarylene sulfide according to one embodiment of the present invention, the molar ratio of water to the amide-based compound present in the polymerization system during the polymerization of the sulfur source and the dihalogenated aromatic compound for the preparation of polyarylene sulfide may be influenced by various factors, and among them, when a reaction product prepared by reacting a hydrosulfide of an alkali metal with a hydroxide of an alkali metal is particularly used as a sulfur source, the influence of the amount of water and the amide-based compound in the sulfur source obtained as a result of the dehydration process is significant. At this time, the amount of water and the amide-based compound in the sulfur source obtained as a result of the dehydration process may be determined by analyzing the concentration of the amide-based compound in the dehydration liquid discharged by the dehydration process via gas chromatography, and thus, the amount of the amide-based compound and water in the residue remaining without being dehydrated can be estimated.

However, since the conventional dehydration process was carried out by a fractional distillation using a column, a lot of time was required to control the content ratio of the water to be removed and the amide-based compound.

In contrast, the dehydration process of the present invention is carried out by controlling a heating temperature and dehydration rate without using a column, so that the concentration of the amide-based compound contained in the dehydration solution is 15 to 40% by volume, and more specifically 25 to 30% by volume.

Specifically, the dehydration process may be carried out by stirring in a temperature range of 130 to 205° C. at a rate of 100 to 500 rpm, so that the concentration of the amide-based compound contained in the dehydration liquid to be discharged is 15 to 40% by volume based on the total volume of the dehydration liquid. When the dehydration process is carried out under the above-mentioned conditions, the amount of water and the amide-based compound remaining in the sulfur source can be easily predicted and controlled. As a result, the molar ratio of water to the amide-based compound present in the polymerization reaction system during the subsequent polymerization reaction and the viscosity grade of the finally prepared polyarylene sulfide can be easily controlled. More specifically, it can be carried out by stirring in a temperature range of 175 to 200° C. at a rate of 100 to 300 rpm, under the conditions that the concentration of the amide-based compound contained in the dehydration liquid is 25 to 30% by volume based on the total volume of the dehydration liquid.

In addition, during the dehydration process, the sulfur contained in the sulfur source reacts with water to produce hydrogen sulfide and an alkali metal hydroxide, and the produced hydrogen sulfide is volatilized. Thus, the amount of sulfur in the sulfur source remaining in the system after the dehydration process can be reduced by the hydrogen sulfide volatilized out of the system during the dehydration process. In one example, when a sulfur source mainly composed of an alkali metal hydrosulfide is used, the amount of sulfur remaining in the system after the dehydrating process is equal to a value obtained by subtracting the molar amount of sulfur in the sulfur source introduced from the molar amount of hydrogen sulfide volatilized out of the system. Accordingly, it is necessary to weigh the amount of effective sulfur contained in the sulfur source remaining in the system after the dehydration process from the amount of the hydrogen sulfide volatilized out of the system.

Specifically, the dehydration process may be carried out until the molar ratio of water is 1 to 5 based on 1 mol of the effective sulfur present in the sulfur source, that is, the residual mixture after dehydration. More specifically, for the preparation of polyarylene sulfide having the melt viscosity according to the present invention, the dehydration process may be carried out until the molar ratio of water is 2.5 to 3.5, more specifically 2.7 to 3.3, based on 1 mol of the effective sulfur present in the residual mixture. When the amount of water in the sulfur source is excessively reduced by the dehydration process, the amount of water can be controlled by adding water before the polymerization reaction.

Accordingly, the sulfur source prepared by the reaction of the hydrosulfide of the alkali metal with the hydroxide of the alkali metal and the dehydration thereof as described above may include the mixed solvent of water and the amide-based compound together with the sulfide of the alkali metal, and the water may be contained in a molar ratio of 2.5 to 3.5 based on 1 mol of sulfur contained in the sulfur source. When the amount of water in the sulfur source meets the above-mentioned range, the polyarylene sulfide having the melt viscosity defined in the present invention can be prepared through the optimization of the ratio of water and the amide-based solvent in the polymerization reaction system. More specifically, the water may be contained in a molar ratio of 2.7 to 3.3 based on 1 mol of sulfur contained in the sulfur source.

Further, the sulfur source may further include a hydroxide of an alkali metal produced by the reaction of sulfur with water.

Next, in the method for preparing polyarylene sulfide according to one embodiment of the present invention, the second step is a step of preparing polyacrylene sulfide by polymerizing the sulfur source prepared in the first step with a dihalogenated aromatic compound.

The dihalogenated aromatic compound which can be used for the preparation of the polyacrylene sulfide is a compound in which two hydrogen atoms are substituted with halogen atoms in the aromatic ring, and specific examples thereof include o-dihalobenzene, m-dihalobenzene, p-dihalobenzene, dihalotoluene, dihalonaphthalene, dihalobiphenyl, dihalobenzoic acid, dihalodiphenyl ether, dihalodiphenyl sulfone, dihalodiphenyl sulfoxide, or dihalodiphenyl ketone, etc., and any one or a mixture of two or more thereof may be used. As for the dihalogenated aromatic compound, the halogen atom may be fluorine, chlorine, bromine, or iodine. Among them, p-dichlorobenzene (p-DCB) may be used in consideration of the reactivity and the effect of reducing the production of reaction by-products during the preparation of polyarylene sulfide.

The dihalogenated aromatic compound may be added in an equivalent amount of 0.8 to 1.2. When the dihalogenated aromatic compound is added within the above-described content range, a polyarylene sulfide having excellent physical properties can be prepared without concern about a reduction in the melting viscosity of the polyarylene sulfide prepared and an increase in the amount of chlorine present in the polyarylene sulfide. Considering that the improvement effect resulting from the control of the addition amount of the sulfur source and the dihalogenated aromatic compound is excellent, the dihalogenated aromatic compound may be more specifically added in an equivalent amount of 0.8 to 1.1.

In addition, the polymerization reaction of the above-described sulfur source with the dihalogenated aromatic compound may be carried out in a solvent of an amide-based compound that is stable to alkali at a high temperature as an aprotic polar organic solvent.

Specific examples of the amide-based compound are as previously described, and considering the excellent reaction efficiency among the exemplified compounds, the amide-based compound may more specifically be a pyrrolidone compound such as N-methyl-2-pyrrolidone (NMP), N-cyclohexyl-2-pyrrolidone, etc.

Further, since the amide-based compound contained in the sulfur source prepared in the first step may act as a cosolvent, the amide-based compound added in the second step can be added in an amount such that the molar ratio of water ($H_2O$) to the amide-based compound present in the polymerization system (molar ratio of water/amide-based compound) is 0.85 or more.

The findings of the research revealed that the amount of water and the amide-based compound present in the polymerization system of the sulfur source and the dihalogenated aromatic compound has an effect on the melt viscosity of the finally prepared polyarylene sulfide, and as the molar ratio of water to the amide-based compound decreased, the melt viscosity of polyarylene sulfide increased. This is because the polyarylene sulfide is phase-separated by using water after the reaction, and in this case, the lower the water content is, the higher the molecular weight is. It has been known that when polymerization reaction products are cooled by adding water in the termination step of a conventional polymerization reaction, the amount of water added has an effect on the particle size of the polyarylene sulfide. However, it is not known whether the molar ratio of water to the amide-based compound present in the polymerization system has an effect on the melt viscosity of polyarylene sulfide.

Specifically, it is possible to produce polyarylene sulfide having a melt viscosity of 0.1 Pa·S to 150 Pa·S when the molar ratio of water to the amide-based compound present in the polymerization system is 0.85 or more. Further, the polyarylene sulfide may have a weight average molecular weight (Mw) of 5000 g/mol 30,000 g/mol. When the molar ratio of water to the amide-based compound present in the polymerization system is less than 0.85, it would be difficult to prepare polyarylene sulfide having the above-mentioned melt viscosity. More specifically, when the molar ratio of water to the amide-based compound present in the polymerization system is 0.85 to 1.3, it is possible to produce polyarylene sulfide having a melt viscosity of 20 Pa·S to 150 Pa·S and a weight average molecular weight (Mw) of 10,000 g/mol to 30,000 g/mol. Still more specifically, when the molar ratio of water to the amide-based compound present in the polymerization system is more than 1.0 and 1.3 or less, it is possible to produce polyarylene sulfide having a melt viscosity of 20 Pa·S or more and less than 50 Pa·S and a weight average molecular weight (Mw) of 15,000 g/mol to 20,000 g/mol. Further, when the molar ratio of water to the amide-based compound present in the polymerization system is 0.85 to 1.0, it is possible to produce polyarylene sulfide having a melt viscosity of 50 Pa·S to 150 Pa·S and a weight average molecular weight (Mw) of more than 20,000 g/mol and 30,000 g/mol or less.

In the present invention, the melt viscosity of the polyarylene sulfide is a value measured at 300° C. while changing each angular frequency from 0.1 rad/s to 100 rad/s using a strain-type rheometer by a frequency sweeping method.

Further, in the present invention, the weight average molecular weight of the polyarylene sulfide can be calculated according to Calculation Formula 1 below using the melt viscosity value of 0.1 rad/s as measured above.

Weight average molecular weight (Mw)=10^((LOG(melt viscosity value)+12.20468)/3.48067) [Calculation Formula 1]

In addition, during the polymerization reaction, other additives for controlling the polymerization reaction and the molecular weight such as a molecular weight regulator, a crosslinking agent, and the like may be further added within the range that does not deteriorate the physical properties and production yield of the finally prepared polyarylene sulfide The polymerization of the sulfur source and the dihalogenated aromatic compound may be carried out at a temperature of 200° C. to 300° C. Further, it may be carried out in multiple stages by changing the temperature within the temperature range mentioned above. Specifically, after the first polymerization reaction at 200° C. or higher and lower than 250° C., the secondary polymerization reaction may be carried out at a temperature that is higher than the temperature for the first polymerization reaction, specifically at 250° C. to 300° C.

The reaction product produced as a result of the polymerization reaction is separated into an aqueous phase and an organic phase, and at this time, polyarylene sulfide, which is a polymerization reactant, is dissolved and contained in the organic phase. Accordingly, a process for precipitation and separation of the produced polyarylene sulfide may be, optionally, further carried out.

Specifically, the precipitation of the polyarylene sulfide may be carried out by adding water in an equivalent ratio of 3 to 5 based on 1 equivalent of sulfur, followed by cooling. When water is added in the above-mentioned content range, the polyarylene sulfide can be precipitated with excellent efficiency.

Then, the precipitated polyarylene sulfide may be, optionally, further subjected to a washing and filter drying process according to a conventional method.

The polyarylene sulfide having various melt viscosities can be easily prepared by the method for producing polyarylene sulfide according to one embodiment of the present invention as described above.

Specifically, polyarylene sulfide prepared by the preparation method may have a melt viscosity of 0.1 Pa·S to 150 Pa·S, and at this time, it may have a weight average molecular weight (Mw) of 5000 g/mol to 30,000 g/mol. More specifically, it may have a melt viscosity of 20 Pa·S to 150 Pa·S and a weight average molecular weight of 10,000 g/mol to 30,000 g/mol. Further, it may have a melt viscosity of 20 Pa·S or more and less than 50 Pa·S and a weight average molecular weight of 15,000 g/mol to 20,000 g/mol, or it may have a melt viscosity of 50 Pa·S to 150 Pa·S and a weight average molecular weight of more than 20,000 g/mol and 30,000 g/mol or less.

The thus-prepared polyarylene sulfide has excellent fluidity, thereby exhibiting improved compatibility with fillers and reinforcing agents. Consequently, it can be useful in the manufacture of molded articles for substituting metals in automobiles, electric or electronic products, or mechanical components, especially in the manufacture of reflectors or base plates for an automobile lamp which requires excellent mechanical properties.

Hereinafter, the action and effect of the present invention will be described by way of specific examples. However, these examples are given for illustrative purposes only, and the scope of the invention is not intended to be limited by these examples.

Example 1

1.01 equivalents of sodium hydrosulfide (NaSH) and 1.06 equivalents of sodium hydroxide (NaOH) were mixed in a reactor to prepare sodium sulfide ($Na_2S$). At this time, 0.44 equivalents of sodium acetate powder, 1.65 equivalents of N-methyl-2-pyrrolidone (NMP), and 6.72 equivalents of distilled water were added to the reactor.

The reactor was heated up to 190° C. for 1 hour while stirring at 150 rpm and, the resulting solution was dehydrated to obtain a residual mixture as a sulfur source. At this time, the NMP concentration (v/v %) in the dehydrated liquid measured by gas chromatography was 26.3%, and the molar ratio of $H_2O/S$ in the residual mixture was calculated to be 2.77.

1.00 equivalent of para-dichlorobenzene (p-DCB) and 1.65 equivalents of NMP were added to the reactor without decreasing the temperature, and the resulting mixed solution was reacted for 2 hours by heating it to 230° C., and then further reacted for 2 hours by heating it again to 250° C. At this time, the molar ratio of $H_2O/NMP$ present in the polymerization system was calculated to be 0.95.

After completion of the reaction, distilled water was added in an equivalent ratio of 3 based on 1 equivalent of sulfur present in the reactor, and then the mixture was stirred for 40 minutes to recover a resultant. The resultant was sequentially washed by using a mixed solution of distilled water and NMP (mixing volume ratio=1:1), and distilled water, and then filtered. Subsequently, it was washed with NMP for 10 minutes at 100° C. and filtered, and also washed with a 0.4% acetic acid aqueous solution at 120° C. and filtered, and again filtered with distilled water for 10 minutes at 100° C. to recover polyphenylene sulfide.

Example 2

1.01 equivalents of NaSH and 1.06 equivalents of NaOH were mixed in a reactor to prepare $Na_2S$. At this time, 0.33 equivalents of sodium acetate powder, 1.65 equivalents of NMP, and 4.72 equivalents of distilled water were added to the reactor.

The reactor was heated up to 190° C. for 1 hour while stirring at 150 rpm, and the resulting solution was dehydrated to obtain a residual mixture as a sulfur source. At this time, the NMP concentration (v/v %) in the dehydrated liquid measured by gas chromatography was 27%, and the molar ratio of $H_2O/S$ in the residual mixture was calculated to be 3.02.

1.00 equivalent of p-DCB and 1.65 equivalents of NMP were added to the reactor without decreasing the temperature, and the resulting mixed solution was reacted for 2 hours by heating it to 230° C., and then further reacted for 2 hours by heating it to 250° C. At this time, the molar ratio of $H_2O/NMP$ present in the polymerization system was calculated to be 0.99.

After completion of the reaction, distilled water was added in an equivalent ratio of 3 based on 1 equivalent of sulfur present in the reactor, and then the mixture was stirred for 40 minutes to recover a resultant. The resultant was sequentially washed by using a mixed solution of distilled water and NMP (mixing volume ratio=1:1), and distilled water and then filtered. Subsequently, it was washed with NMP for 10 minutes at 100° C. and filtered, and also washed with a 0.4% acetic acid aqueous solution at 120° C. and filtered, and again filtered with distilled water for 10 minutes at 100° C. to recover polyphenylene sulfide.

Example 3

1.01 equivalents of NaSH and 1.06 equivalents of NaOH were mixed in a reactor to prepare $Na_2S$. At this time, 0.44 equivalents of sodium acetate powder, 1.65 equivalents of NMP, and 6.72 equivalents of distilled water were added to the reactor.

The reactor was heated up to 190° C. for 1 hour while stirring at 150 rpm, and the resulting solution was dehydrated to obtain a residual mixture as a sulfur source. At this time, the NMP concentration (v/v %) in the dehydrated liquid measured by gas chromatography was 30.0%, and the molar ratio of $H_2O/S$ in the residual mixture was calculated to be 3.03.

1.00 equivalent of p-DCB and 1.65 equivalents of NMP were added to the reactor without decreasing the temperature, and the resulting mixed solution was reacted for 2 hours by heating it to 230° C., and then further reacted for 2 hours by heating it to 250° C. At this time, the molar ratio of $H_2O/NMP$ present in the polymerization system was calculated to be 1.07.

After completion of the reaction, distilled water was added in an equivalent ratio of 5 based on 1 equivalent of sulfur present in the reactor, and then the mixture was stirred for 40 minutes to recover a resultant. The resultant was sequentially washed by using a mixed solution of distilled water and NMP (mixing volume ratio=1:1) and distilled water, and then filtered. Subsequently, it was washed with NMP for 10 minutes at 100° C. and filtered, and also washed with a 0.4% acetic acid aqueous solution at 120° C. and filtered, and again filtered with distilled water for 10 minutes at 100° C. to recover polyphenylene sulfide.

Example 4

1.01 equivalents of NaSH and 1.06 equivalents of NaOH were mixed in a reactor to prepare $Na_2S$. At this time, 0.44 equivalent of sodium acetate powder, 1.65 equivalents of NMP, and 6.72 equivalents of distilled water were added to the reactor.

The reactor was heated up to 190° C. for 1 hour while stirring at 150 rpm, and the resulting solution was dehydrated to obtain a residual mixture as sulfur source. At this time, the NMP concentration (v/v %) in the dehydrated liquid measured by gas chromatography was 28.5%, and the molar ratio of $H_2O/S$ in the residual mixture was calculated to be 3.27.

1.00 equivalent of p-DCB and 1.65 equivalents of NMP were added to the reactor without decreasing the temperature, and the resulting mixed solution was reacted for 2 hours by heating it to 230° C., and then further reacted for 2 hours by heating it to 250° C. At this time, the molar ratio of $H_2O/NMP$ present in the polymerization system was calculated to be 2.89.

After completion of the reaction, distilled water was added in an equivalent ratio of 5 based on 1 equivalent of sulfur present in the reactor, and then the mixture was stirred for 40 minutes to recover a resultant. The resultant was sequentially washed with a mixed solution of distilled water and NMP (mixing volume ratio=1:1) and distilled water, and then filtered. Subsequently, it was washed with NMP for 10 minutes at 100° C. and filtered, and also washed with a 0.4% acetic acid aqueous solution at 120° C. and filtered, and again filtered with distilled water for 10 minutes at 100° C. to recover polyphenylene sulfide.

Example 5

1.01 equivalents of NaSH and 1.06 equivalents of NaOH were mixed in a reactor to prepare $Na_2S$. At this time, 0.44 equivalents of sodium acetate powder, 1.65 equivalents of NMP, and 6.72 equivalents of distilled water were added to the reactor.

The reactor was heated up to 190° C. for 1 hour while stirring at 150 rpm, and the resulting solution was dehydrated to obtain a residual mixture as sulfur source. At this time, the NMP concentration (v/v %) in the dehydrated liquid measured by gas chromatography was 28.8%, and the molar ratio of $H_2O/S$ in the residual mixture was calculated to be 3.02.

1.00 equivalent of p-DCB and 1.35 equivalents of NMP were added to the reactor without decreasing the temperature, and the resulting mixed solution was reacted for 2 hours by heating it to 230° C., and then further reacted for 2 hours by heating it to 250° C. At this time, the molar ratio of $H_2O/NMP$ present in the polymerization system was calculated to be 1.21.

After completion of the reaction, distilled water was added in an equivalent ratio of 3 based on 1 equivalent of sulfur present in the reactor, and then the mixture was stirred for 40 minutes to recover a resultant. The resultant was sequentially washed with a mixed solution of distilled water and NMP (mixing volume ratio=1:1) and distilled water, and filtered. Subsequently, it was washed with NMP for 10 minutes at 100° C. and filtered, and also washed with a 0.4% acetic acid aqueous solution at 120° C. and filtered, and again filtered with distilled water for 10 minutes at 100° C. to recover polyphenylene sulfide.

Experimental Example 1

The physical properties of the polyphenylene sulfide prepared in Examples 1 to 5 were measured in the following manner, and the results are shown in Table 1 below. Further, in order to confirm the effect of the control of the molar ratios of $H_2O/S$, NMP/S, and $H_2O/NMP$ used in the polymerization reaction on the melt viscosity and molecular weight, the molar ratios are shown together in Table 1 below.

(1) Melt viscosity (MV) (Pa·S): Each polyphenylene sulfide resin was placed on an equilibrium plate using an ARES-G2 (Advanced Rheometric Expansion System). Then, the melt viscosity was measured at 300° C. while changing angular frequency from 0.1 rad/s to 100 rad/s using a frequency sweeping method.

(2) Weight average molecular weight (g/mol): It is proportional to the size of MV, and the weight average molecular weight (Mw) was calculated according to Calculation Formula 1 below using the melt viscosity value of 0.1 rad/s measured above.

$$\text{Weight average molecular weight (Mw)} = 10^{\wedge}((LOG(\text{melt viscosity value})+12.20468)/3.48067) \quad \text{[Calculation Formula 1]}$$

TABLE 1

| | Residual molar ratio in polymerization reaction system | | | Melt viscosity (Pa · S) | Weight average molecular weight (g/mol) |
| --- | --- | --- | --- | --- | --- |
| | $H_2O/S$ (mol/mol) | NMP/S (mol/mol) | $H_2O/NMP$ (mol/mol) | | |
| Example 1 | 2.77 | 2.92 | 0.95 | 106.50 | 23,778 |
| Example 2 | 3.02 | 3.05 | 0.99 | 74.84 | 21,486 |
| Example 3 | 3.03 | 2.84 | 1.07 | 46.22 | 18,708 |
| Example 4 | 3.27 | 2.89 | 1.13 | 34.51 | 17,202 |
| Example 5 | 3.02 | 2.49 | 1.21 | 23.33 | 15,372 |

Experimental Example 2

Polyphenylene sulfide was prepared in the same manner as in Example 1, except that the molar ratio of water ($H_2O$) and NMP in the polymerization reaction system was variously changed, and the melt viscosity of the prepared polyphenylene sulfide was measured in the same manner as in Experimental Example 1. The results are shown in the FIGURE.

As a result of the experiment, the melt viscosity decreased as the molar ratio of water/NMP increased, and it was found therefrom that the melt viscosity of the polyarylene sulfide prepared through the control of the ratio of water/NMP in the polymerization reaction system could be controlled.

Comparative Example 1

1.01 equivalents of NaSH and 1.06 equivalents of NaOH were mixed in a reactor to prepare $Na_2S$. At this time, 0.44 equivalents of sodium acetate powder, 1.65 equivalents of NMP, and 4.72 equivalents of distilled water were added to the reactor.

The reactor was heated up to 190° C. for 1 hour while stirring at 150 rpm, and the resulting solution was dehydrated to obtain a residual mixture as sulfur source. At this time, the NMP concentration (v/v %) in the dehydrated liquid measured by gas chromatography was 28.6%, and the molar ratio of H$_2$O/S in the residual mixture was calculated to be 2.14.

1.00 equivalent of p-DCB and 1.35 equivalents of NMP were added to the reactor without decreasing the temperature, and the resulting mixed solution was reacted for 2 hours by heating it to 230° C., and then further reacted for 2 hours by heating it to 250° C. At this time, the molar ratio of H$_2$O/NMP present in the polymerization system was calculated to be 0.72.

After completion of the reaction, distilled water was added in an equivalent ratio of 3 based on 1 equivalent of sulfur present in the reactor, and then the mixture was stirred for 40 minutes to recover a resultant. The resultant was sequentially washed by using a mixed solution of distilled water and NMP (mixing volume ratio=1:1) and distilled water, and then filtered. Subsequently, it was washed with NMP for 10 minutes at 100° C. and filtered, and also washed with a 0.4% acetic acid aqueous solution at 120° C. and filtered, and again filtered with distilled water for 10 minutes at 100° C. to recover polyphenylene sulfide.

The melt viscosity of the recovered polyphenylene sulfide was measured in the same manner as in Experimental Example 1, and as a result, the melt viscosity was 1063.1 Pa·S and the weight average molecular weight was 46,503 g/mol.

The invention claimed is:

1. A method for preparing a polyarylene sulfide having a melt viscosity of 0.1 Pa·S to 150 Pa·S, the method comprising:
   reacting a hydrosulfide of an alkali metal with a hydroxide of an alkali metal in a mixed solvent of water and a first amide-based compound in the presence of an organic acid salt of an alkali metal to obtain a reaction product,
   subjecting the reaction product to a dehydration process to obtain a sulfur source comprising a sulfide of an alkali metal and a mixed solvent of water and the first amide-based compound, wherein the concentration of the first amide-based compound contained in a dehydration liquid discharged during the dehydration process is 15 to 40% by volume based on the total volume of the dehydration liquid; and
   adding a dihalogenated aromatic compound and a second amide-based compound to the sulfur source to carry out a polymerization reaction,
   wherein the second amide-based compound is added in an amount such that the molar ratio of water to the total amount of the first and second amide-based compound present in the polymerization reaction system is 0.85 or more.

2. The method for preparing polyarylene sulfide of claim 1, wherein the water in the mixed solvent is present in an equivalent ratio of 1 to 8 based on 1 equivalent of the first amide-based compound.

3. The method for preparing polyarylene sulfide of claim 1, wherein the organic acid salt of an alkali metal is added in an equivalent ratio of 0.01 to 1.0 based on 1 equivalent of the hydrosulfide of an alkali metal during the reaction of the hydrosulfide of an alkali metal with the hydroxide of an alkali metal in the first step.

4. The method for preparing polyarylene sulfide of claim 1, wherein the organic acid salt of an alkali metal includes lithium acetate, sodium acetate, or a mixture thereof.

5. The method for preparing polyarylene sulfide of claim 1, wherein the sulfur source comprises water in a molar ratio of 2.5 to 3.5 based on 1 mol of sulfur.

6. The method for preparing polyarylene sulfide of claim 1, wherein the dihalogenated aromatic compound comprises as least one selected from the group consisting of o-dihalobenzene, m-dihalobenzene, p-dihalobenzene, dihalotoluene, dihalonaphthalene, dihalobiphenyl, dihalobenzoic acid, dihalodiphenyl ether, dihalodiphenyl sulfone, dihalodiphenyl sulfoxide, and dihalodiphenyl ketone.

7. The method for preparing polyarylene sulfide of claim 1, wherein the dihalogenated aromatic compound is present in an equivalent amount of 0.8 to 1.2.

8. The method for preparing polyarylene sulfide of claim 1, wherein the second amide-based compound is added in an amount such that the molar ratio of water to the total amount of the first and second amide-based compounds present in the polymerization reaction system (molar ratio of water/amide-based compound) is more than 1.0 and 1.3 or less, and
   the polyarylene sulfide has a melt viscosity of 20 Pa·S or more and less than 50 Pa·S and a weight average molecular weight of 15,000 g/mol to 20,000 g/mol.

9. The method for preparing polyarylene sulfide of claim 1, wherein the second amide-based compound in the second step is added in an amount such that the molar ratio of water to the total amount of the first and second amide-based compounds present in the polymerization reaction system (molar ratio of water/amide-based compound) is 0.85 to 1.0, and the polyarylene sulfide has a melt viscosity of 50 Pa·S to 150 Pa·S and a weight average molecular weight of more than 20,000 g/mol and 30,000 g/mol or less.

10. The method for preparing polyarylene sulfide of claim 1, further comprising a step of adding water in an equivalent ratio of 3 to 5 based on 1 equivalent of sulfur and cooling after the polymerization reaction.

* * * * *